G. D. JONES.
WEIGHING, PACKING, AND PRESSING MACHINE.
No. 4,610. Patented June 27, 1846.
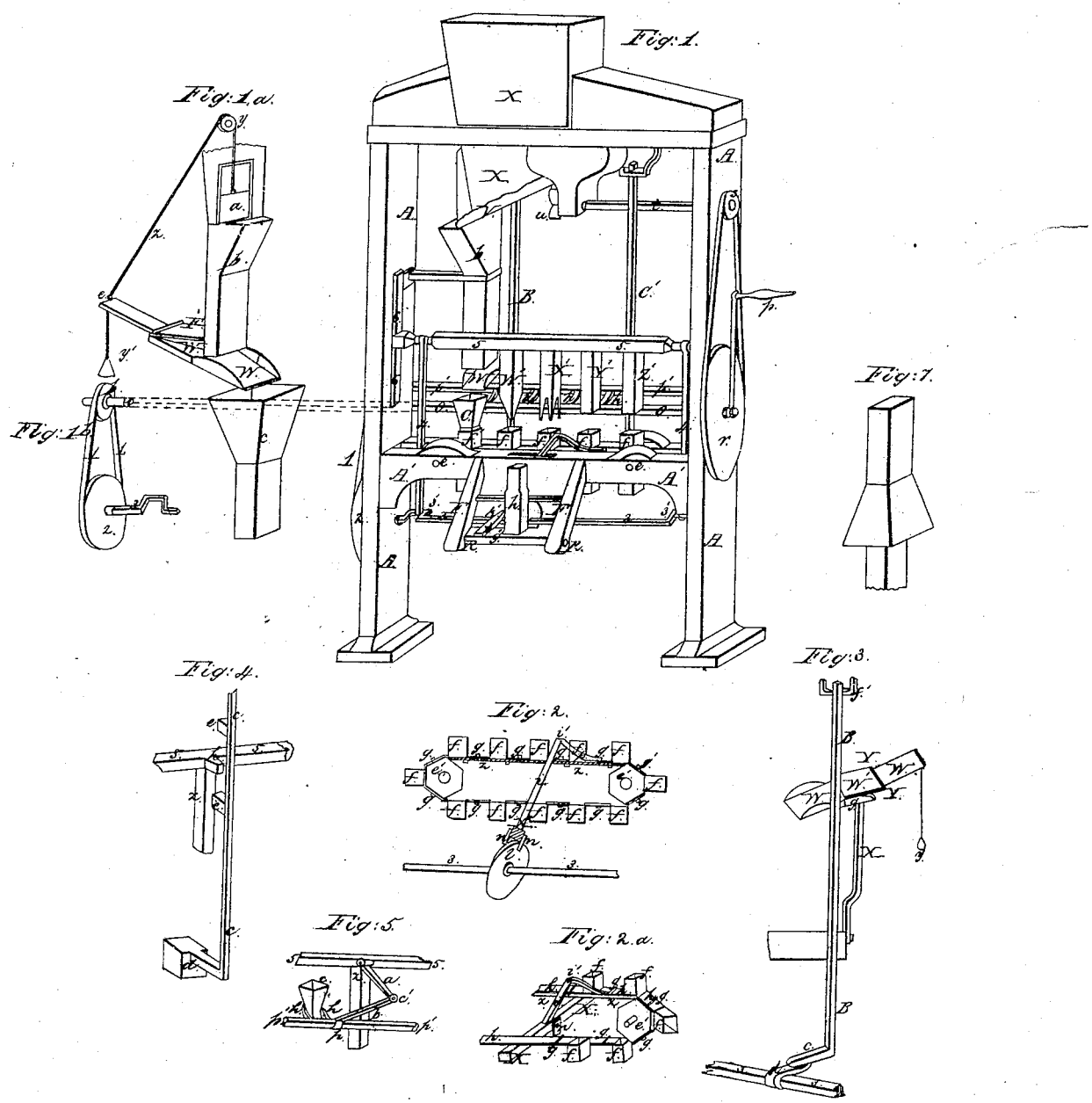

UNITED STATES PATENT OFFICE.

GILBERT D. JONES, OF NEW YORK, N. Y.

IMPROVEMENT IN PACKING AND PRESSING SPICES.

Specification forming part of Letters Patent No. 4,610, dated June 27, 1846.

*To all whom it may concern:*

Be it known that I, GILBERT D. JONES, of the county and State of New York, have invented a new Combination Weighing, Packing, and Pressing Machine; and I do hereby declare the following is a full and exact description of the same, reference being had to the annexed drawings, which make a part of this specification.

My invention is for the purpose of weighing, packing, and pressing spices, coffee, drugs, flour, and other materials, which are usually put up in packages.

For the purpose of exhibiting the objects of it more definitely, I will proceed to describe one that I have arranged for the weighing and packing of spices.

The prominent features of this machine consist, first, of means to convey the spices into a "counterbalance-scales," which are so contrived by the balance end of the latter being connected with a cord which passes over a pulley to the sliding door of a hopper as to admit of any weight of spices that may be required for the ordinary description of packages used in the business; second, the mode of dumping the spices from the scales into the package-paper, which has been previously folded and sealed at one end; third, an endless chain of molds of suitable form and dimensions to receive the package-paper. By the horizontal movement of this endless chain the packages in the molds are successively brought to their respective places to receive the spices from the counterbalance-scales, to be packed and pressed, and finally, in a finished shape and condition, ejected from the molds into a basket or receiver.

Figure 1 is a perspective view of the machine. X X is the hopper, in which a sliding door is fixed. This door is shown in Fig. 1ª to a layer-scale, where $a$ is the door of the hopper, which is raised and lowered by a cord, $z$, passing over a pulley, $y$, and its farther end fastened to the balance end $e$ of the counterbalance-scales W W. When the scales are in a position, as shown in this figure, so as to dump the spices into the funnel C, the door $a$ has descended and closed the mouth of the hopper, and thereby stopped the egress of the spices.

Referring again to Fig. 1, $b$ is the funnel through which the spices fall into the counterbalance-scales W. C is the movable funnel placed in one of the molds $f$. $r$ is a wheel which is turned (by human, steam, or water power) by the crank-handle $p$. Around this wheel is a belt, which passes over the wheel $s$ and turns the shaft $t$, which has a beater, $u$, upon the farther end of it. This beater $u$ in its revolution gives a shaking motion to the bottom of the hopper, the latter being connected to the sides of the hopper by a strip of leather, $v$. The shaking motion thus given causes the spices in the hopper to descend into the funnel $b$ when the mouth of the hopper is open. The driving-shaft O O extends across the machine, having a journal working in its bearings, and upon its extremity is fixed a wheel or pulley, with a belt, 1, passing over it and the wheel 2. These latter are shown in Fig. 1ᵇ, where $o$ is the driving-shaft; $b$, a pulley-wheel fixed upon its end. 2 is another pulley-wheel fixed upon the end of the crank-axle 3, and 1 1 is a belt which passes over the pulley-wheel $b$ and under the wheel 2.

In Fig. 1, B and C' are sliding rods working vertically, the former to act upon the counterbalance of the scales and the latter to eject the packages from the molds. These vertical rods and their operations are shown and explained to a layer-scale in Figs. 3 and 4, which follow.

In Fig. 1, $f f f f$ are molds fixed upon an endless chain, which revolves around two hexagonal wheels, the ends $e\ e$ of their axles only being shown in the drawings, but which are more fully exhibited and described in Fig. 2. $p'\ p'$ is a rock-shaft, having teeth $h\ h\ h$ attached to it, the use of which is described in Fig. 5.

Fig. 2 shows a section through the molds $f\ f f f$, platen or bed $z\ z$, and hexagonal wheels $e'\ e'$. The molds $f f f f$ are made of tin or other suitable material, open top and bottom. These molds are connected together by an endless chain of the same width as the molds, and the endless chain is linked together with a rivet-joint, $g\ g$, between each pair of molds. These are shown in Fig. 2ª in perspective, where $f\ f\ f$, &c., are the molds. $g\ g$ are the rivet-joints connecting the chain $h\ h\ h$. $e'$ is one of the hexagonal wheels, which revolves on axles working in the frame of the machine, their ends being shown at $e\ e$ in Fig. 1.

In Figs. 2 and $2^a$, $z\ z$ is a platen or bed of sheet metal, permanently fixed, so as to form a bottom for the molds while the packages which are within them undergo the operation of filling, packing, pressing, and sealing.

In Fig. 2, $i$ is a lever, one end being mortised and tenoned into a rock-shaft, X. (Seen, also, in the perspective view, Fig. $2^a$.) This rock-shaft is fixed at right angles to the crank-shaft 3 3, Fig. 1, and its ends work in the frame A A and the corresponding frame opposite. The rock-shaft X (shown in Fig. 2 and $2^a$) has two projecting ears, $n\ n$.

In Fig. 2, $l$ is a wheel fixed in the crank-shaft 3 3, beveled on its periphery, so as to act as a cam or eccentric; hence, when the wheel $l$ revolves, it acts against the projecting ears, alternately, carrying the rock-shaft X and the lever $i$ with a forward and reverse motion. At the extremity $i'$ of the lever $i$, Figs. 2 and $2^a$, a bent hand, $p$, is attached to it by a joint, with a pin running through and connecting them together. In the action of the lever $i$, corresponding with the motion of the rock-shaft X, the hand $p$ is enabled to push the endless chain forward by its acting upon the joints $g\ g\ g$, which connect the endless chain together.

From the above it will be seen that the revolving of the wheel $r$, Fig. 1, turns the shaft $o$, and by a wheel at its opposite extremity, (seen in Fig. $1^b$,) with the belt 1, gives motion to the wheel 2 and the crank-axle 3 3.

To this crank-shaft 3 3 vertical rods 4 4, Fig. 1, are attached, and by their upper extremities being connected to the cross-piece 5 5 causes the latter to ascend and descend in proportion to the throw of the cranks $3'\ 3'$.

To enable the cross-piece 5 5 to slide steadily, the ends of it are notched and fitted upon a corresponding rail, 6 6, one of which only is shown upon the drawings. Upon the under side of the cross-piece 5 5 are tenoned and bolted four drivers, $W'\ X'\ Y'\ Z'$, which operate in packing, pressing, and stamping.

To cause the endless chain with the molds $f\ f\ f$, &c., to move around the hexagonal wheels $e'\ e'$, Figs. 2 and $2^a$, the hand $p$ is employed by being moved by the lever $i$, acted upon in the manner before described, by the rock-shaft X and beveled wheel $l$.

That which now remains is to describe the action and objects of the vertical sliding rods B and $C'$, Fig. 1, rock-shaft $p'\ p'\ p'$, and the stud $h'$. (Shown in the same Fig. 1.)

Fig. 3 is a drawing of the vertical rod B and the counterbalance-scales W, Figs. 1 and $1^a$. B is the sliding vertical rod. $c$ is a foot projecting at right angles to it. 3 3 is the crank-axle, figured the same in Fig. 1. $d$ is a step fixed upon the crank-shaft 3 3. When the crank shaft or axle 3 3 revolves, the step $d$ is carried around with it, and in its motion it strikes the under side of the foot $c$ and raises it in proportion to the length of the step $d$. The upper end of the rod B slides through a slit, $e$, cut in a stirrup, $f'$, fixed to the frame of the machine, similar to the one shown in Fig. 1 for the slide-rod $c'$.

In Fig. 3, $g$ is a stud projecting from the sliding rod B. W W are the scales, and $W'$ is the counter-balance, hinged to the scales at Y Y. The scales and counter-balance are made of the same material as ordinary scales. By means of the hinge Y Y the counter-balance may be raised to a vertical position or be allowed to fall upon the scales. The counter-balance on the side next to the sliding rod B projects, so as to be about an inch wider than the scales. The scales are fixed upon a horizontal piece notched onto the upright stand X, with sufficient freedom to rock with the movement of the scales. The action of these parts is the following: When the slide-rod B is moved upward by the step $d$ acting upon the foot C, the stud $g$ raises the counter-balance to a vertical position, and on the descent of the sliding rod B the counter-balance falls down again to the scales.

The object of the "counter-balance" is to counterbalance the weight $y'$ until the scales have been delivered of the spices into the funnel C, Fig. 1.

Fig. 4, $c$ is the sliding rod. $d$ is a foot, which projects and is of such dimensions as to slide in and out of any one of the molds $f\ f f$, Fig. 2. $e\ e'$ are studs projecting from the sliding rod $c$. 5 5 is the cross-piece. (Seen also in Fig. 1.) $h$ is a stud projecting from the back of the cross-piece 5 5. $Z'$ is the stamper. (Shown also in Fig. 1.) The cross-piece 5 5 ascends and descends by the action of the rods 4 4, Fig. 1. The stud $h$ in its upward motion strikes the under side of the stud $e$ of the sliding rod $c$ and raises it, and in its downward motion strikes $e'$ and depresses the rod $c$. These studs are so arranged as to act upon the rod $c$ at the respective times when it is requisite to press the packages out of the molds and raise it from that position.

Fig. 5 shows part of the cross-piece 5 5, Fig. 1, the rock-shaft $p'\ p'$, teeth $h\ h\ h$, and the manner of raising by the latter one of the movable funnels, (lettered C on Fig. 1.) 5 5 is the cross-piece. (Also shown in Fig. 1.) $a$ and $b$ are two levers, connected together by a knuckle-joint at $c'$. $a$ is hinged with a folding joint to the cross-piece 5 5, and $b$ is secured to the rock-shaft $p'\ p'$ by a collar, $p$. Z is the stamper. (Shown also in Fig. 1.) $h\ h$ are teeth projecting from and secured into the rock-shaft $p'\ p'$. When the cross-piece 5 5 is raised and lowered by the vertical rods 4 4, Fig. 1, the levers $a$ and $b$ are acted upon so as to turn the rock-shaft $p'\ p'$, carrying with it the teeth $h\ h$, &c., and the movable funnel $c$, Fig. 1, when it arrives at the position designed for it to be removed. The position designed for the raising of the movable funnel is when it arrives at $f'$, Fig. 1. By that time the cross-piece 5 5 is raised to its height and consequently the rock-shaft $p'\ p'$ is turned by the levers $a$ and $b$, so as to raise the teeth $h\ h$ and take up the movable funnel from the mold $f$ in Fig. 1.

Having described the drawings, it remains to state more connectedly the operation of the machine.

The machine may be constructed of wood, iron, or other suitable material, and gearing might be substituted for the crank-handle and driven by steam or water power. The motion of the cross-piece 5 5, Fig. 1, has been shown in the description of Fig. 3. The four drivers W' X' Y' Z', Fig. 1, in their descent consequently perform the operations of packing, pressing, and stamping. W' is pointed in order to press the spices into the middle of the package. X' is shaped to press it into the angles of the package. Y' is to press the spices and to square the surface. Z' is to stamp the package after the ends of the paper have been turned down and sealed. When the package in the mold has arrived so as to be pressed by Y', the funnel C, Fig. 1, is sufficiently raised by the teeth $h\ h$ of the rock-shaft $p'\ p'$, before described, and it is then taken away by the attendant. It will be observed that four funnels similar to C, Fig. 1, are required. When the package arrives under Z', the ends of the package-paper are folded and sealed by the attendant. That completed, the driver Z' presses upon the package and finishes its shape to receive the labels. In the revolving of the endless chain with the molds the finished package passes over the hexagonal rollers $e\ e$, Figs. 2 and $2^a$, before explained, and immediately its position is reversed the hammer $d$ of the slide-rod $c$, Fig. 4, (in the way described in that figure,) presses out the package from the mold into a basket or receptacle underneath.

In Fig. 1, F F are projecting pieces, framed into A' A' in a slanting direction. Their ends are connected by a rock rail or shaft $g'$, the ends of the latter turning in F F at R R. $h'$ is a post joggled into the rock-shaft $g'$. $s$ is a step secured to $g'$ and projecting over the axle 3 3. In the revolving of the crank-axle 3 3 the step $s$ is raised, which rocks the shaft alternately backward and forward and carries with it the post $h'$, so that the latter may at one time be vertical and another slanting inward.

The duties of the attendant of the machine are to fix the movable funnel upon the post, as shown in Fig. 7, to fold the paper around it and seal the end of the latter. The funnel and package-paper are then taken off the post and placed in the mold inverted, as shown in Fig. 1 at $c$, and as the endless chain carries it forward the next in succession must be similarly treated. When the molds arrive under the driver Y', Fig. 1, the funnel is, by the means before described, sufficiently raised out of the mold by the teeth $h\ h$ to be taken off by the attendant. The package in the mold, being without the funnel, passes under the driver Z', and finally the ends of the package-paper are turned down and sealed by the attendant.

What I claim as my invention, and desire to secure by Letters Patent, is—

The endless chain of molds open at both ends and stationary bed-plate (Z Z in Figs. 2 and $2^a$) combined with the succession of differently-formed presses or pistons W', X', Y', and Z'.

GILBERT D. JONES.

Witnesses:
    EDWD. JONES,
    F. E. WESTBROOK.